United States Patent
Lacroix

(10) Patent No.: US 9,139,231 B2
(45) Date of Patent: Sep. 22, 2015

(54) DRAINAGE DEVICE FOR DISCHARGING LIQUID OUT OF THE WATER BOX OF A MOTOR VEHICLE

(71) Applicant: GM GLOBAL TECHNOLOGY OPERATIONS LLC, Detroit, MI (US)

(72) Inventor: Joachim Lacroix, Flonheim (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 14/062,196

(22) Filed: Oct. 24, 2013

(65) Prior Publication Data

US 2014/0117722 A1    May 1, 2014

(30) Foreign Application Priority Data

Oct. 24, 2012  (DE) .......................... 10 2012 020 861

(51) Int. Cl.
  *B62D 25/08*  (2006.01)
  *B60R 13/07*  (2006.01)

(52) U.S. Cl.
  CPC .............. *B62D 25/081* (2013.01); *B60R 13/07* (2013.01)

(58) Field of Classification Search
  CPC .............................. B62D 25/081; B60R 13/07
  USPC ................................................ 296/208, 192
  See application file for complete search history.

(56) References Cited

U.S. PATENT DOCUMENTS

| 5,127,703 | A | 7/1992 | Takahashi |
| 7,000,979 | B2 * | 2/2006 | Borkowski et al. ........... 296/192 |
| 8,128,156 | B2 | 3/2012 | Daab et al. |
| 8,220,864 | B2 | 7/2012 | Mildner et al. |
| 2005/0134089 | A1 | 6/2005 | Borkowski et al. |
| 2013/0247348 | A1 * | 9/2013 | Kitagawa et al. .......... 29/402.08 |

FOREIGN PATENT DOCUMENTS

| DE | 4326869 A1 | 1/1995 |
| DE | 19850372 A1 | 5/2000 |
| DE | 102005011479 A1 | 9/2006 |
| DE | 602005002184 T2 | 6/2008 |

OTHER PUBLICATIONS

German Patent Office, German Patent Search Report for Application No. 102012020861.8, dated Jul. 4, 2013.

* cited by examiner

*Primary Examiner* — Glenn Dayoan
*Assistant Examiner* — Melissa A Black
(74) *Attorney, Agent, or Firm* — Ingrassia Fisher & Lorenz PC

(57) ABSTRACT

A drainage device is provided for a motor vehicle, which serves for discharging liquid out of the water box of a motor vehicle. The drainage device includes, but is not limited to a line portion, which is at least partially incorporated in an insulating structure for the front wall of the motor vehicle. A motor vehicle is also provided with a water box and a drainage device that is fluidically connected to the water box.

10 Claims, 3 Drawing Sheets

DRAINAGE DEVICE FOR DISCHARGING LIQUID OUT OF THE WATER BOX OF A MOTOR VEHICLE

CROSS-REFERENCE TO RELATED APPLICATION

This application claims priority to German Patent Application No. 10 2012 020 861.8 filed Oct. 24, 2012, which is incorporated herein by reference in its entirety.

TECHNICAL FIELD

The technical field generally relates to a drainage device for a motor vehicle, which serves for discharging liquid out of the water box of a motor vehicle.

BACKGROUND

Motor vehicles usually comprise a water box, which is arranged below the windshield and serves for collecting the liquid striking the windshield. The liquid collected in the water box is usually discharged downwards on the vehicle with a drain. However, in the case of motor vehicles up to now the drain is relatively voluminous.

Therefore, at least one object is to provide a drainage device for discharging liquid out of the water box of a motor vehicle with the features mentioned at the outset, which can be space-savingly integrated in the motor vehicle.

SUMMARY

A drainage device for a motor vehicle is provided that serves for discharging liquid out of the water box of a motor vehicle, has at least one line portion, in particular elongated line portion, which is at least partially incorporated in an insulating structure for a wall, in particular the front wall of the motor vehicle. Through such a drainage device, the drain for the liquid of the water box is space-savingly accommodated, since the drain is integrated in the insulating structure.

The drain is particularly space-savingly realized when according to an embodiment, the line portion is surrounded by the insulating structure. For example, the line portion can be arranged in a depression or interruption of the insulating structure. The insulating structure can be thermally insulating and/or sound insulating. Preferably, the line portion runs along a face side of the insulating structure facing the wall or front wall. The face side can for example be a face side of the insulating structure that can be laid against the wall or front wall. Through such a course of the line portion, the liquid is specifically directed past the engine compartment of the motor vehicle.

The line portion can be integrated in the motor vehicle particularly space-savingly, when according to a configuration of the invention the course of the line portion substantially corresponds to the course of the wall or front wall in the installation region. Because of this it is ensured that the insulating structure in the installation region is also optimally laid against the wall and can thus optimally develop its thermally insulating and/or sound-insulating function.

According to an embodiment it can be provided that the line portion comprises a plurality of portions, of which adjacent portions are arranged angled to one another and at least two of the portions form a plane. At least one of the portions projects out of the plane or is arranged outside the plane. Through these length portions of the line portion, a line course is obtained which can be space-savingly laid along the course of the wall or front wall of the motor vehicle and whose outlet for discharging the liquid can be specifically arranged in a predetermined location on the motor vehicle.

Preferably, the line portion has a substantially rectangular cross section. Preferably, the wide sides of the rectangular cross section of the line portion are substantially arranged parallel to the outer surface of the insulating structure. Because of this, a relatively large drainage cross section is achieved. The line portion in thickness direction of the insulating structure is a relatively compact construction.

A further embodiment provides that the line portion is injection-molded into the insulating structure. Because of this the line portion can be integrated in the insulating structure in a technically simple manner.

It is appropriate that the parts of the drainage device, in particular the line portion, consist of plastic. Because of this the drainage device can be realized cost-effectively and light in weight. Because of this, injection-molding the line portion into the insulating structure is also possible.

According to a further embodiment, the drainage device comprises a connecting part with which the line portion is fluidically connectable to the water box of a motor vehicle. Through the connecting part, the line portion can be connected to the water box in a manner that is simple with respect to the assembly. In order to be able to realize as strong as possible a connection of the line portion to the water box it is appropriate that the connecting part is connectable to the line portion by means of a clip and/or engagement connection or with a press connection, preferentially releasably connectable.

According to an embodiment, it can be provided that the connecting part comprises a connecting piece portion that is insertable in the line portion, which at an end region has a collar which projects to the outside. Because of this, the line portion from the water box can be fluidically connected to the water box in a manner that is simple with respect to the assembly. To this end, merely the connecting part from the water box has to be inserted with its connecting piece portion through a through-opening arranged for example in the bottom of the water box into the line portion. The collar of the connecting part in this case serves as a stop, against which the rimming of the through-opening of the water box comes to lie when the connecting part is brought into its end position on the water box and the line portion subject to establishing the flow connection.

It is appropriate that the connecting piece portion comprises at least one clip and/or engagement means, which enters into an operational position against a counterpart with the line portion in a positively joined and/or clamping manner in order to fix the connecting part against the line portion, in particular to releasably fix the connecting part against the line portion. Preferably, the clip and/or engagement is arranged or formed on the connecting piece portion in such a manner that when inserting the connecting piece portion in the line portion, the counterpart means enters into an operational position.

For example, the clip and/or engagement can be arranged on the outer circumference of the connecting piece portion and enter into an operational position with the counterpart arranged on the inner circumference of the line portion. It is appropriate that the connecting part is a plastic part. Despite its relatively complicated geometry, the connecting part can be cost-effectively realized in this way.

A motor vehicle is also provided with a water box and a drainage device of the type described above that is fluidically connected to the water box.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
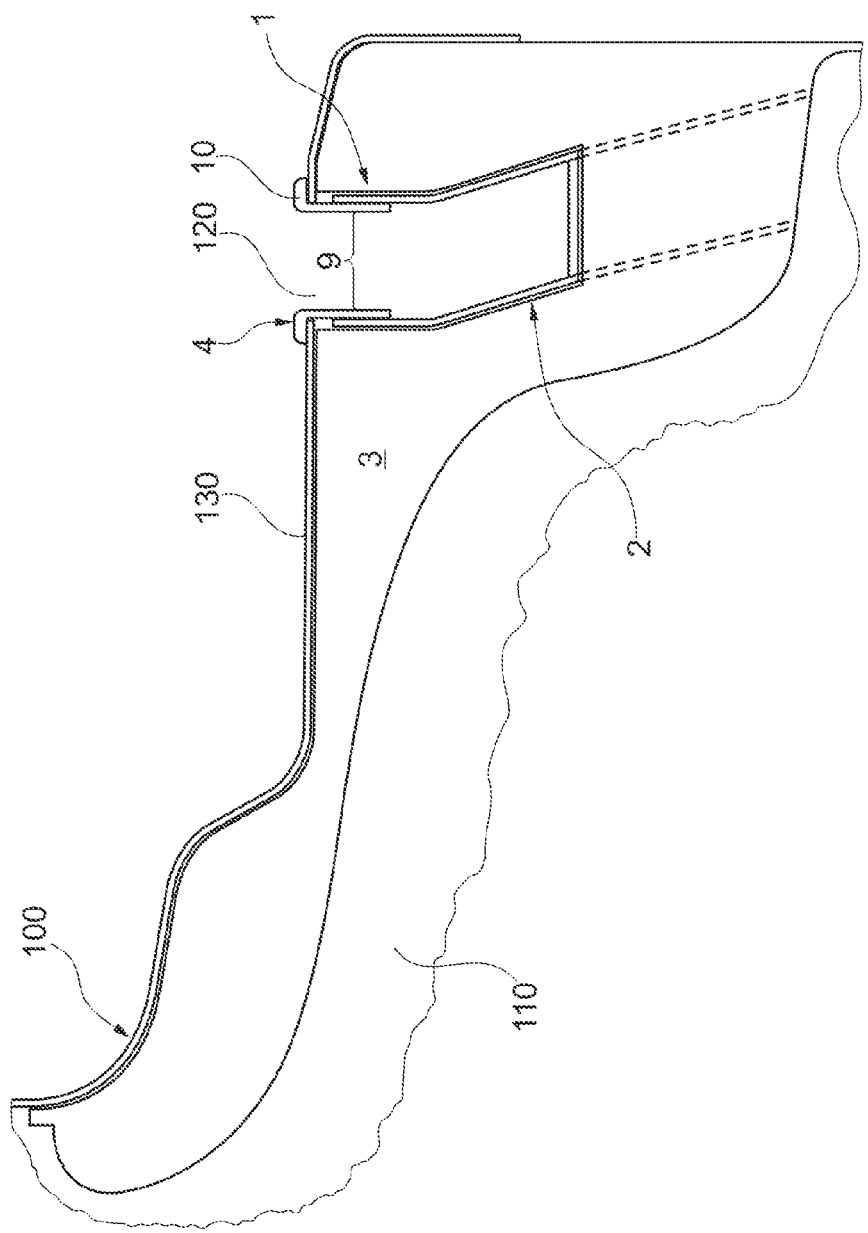
FIG. 1 is a possible embodiment of a drainage device for discharging liquid out of the water box of a motor vehicle, installed on a water box, in sectional representation.

FIG. 1 shows, in a schematic representation, a possible embodiment of a drainage device 1 for discharging liquid out of the water box 100 of a motor vehicle (not shown in FIG. 1). The drainage device 1 has a line portion 2, which is connected to the water box 100, so that the liquid that is present in the water box 100 can drain via the line portion 2. The line portion 2, in particular line or channel, is fluidically connected preferably to the bottom of the water box for this purpose.

In order to accommodate the drainage device 1 in the motor vehicle in as compact a construction as possible, it is provided that the line portion 2 is incorporated in an insulating structure 3. The insulating structure 3 is substantially laid or layable against a wall 110 adjoining the water box 100. The wall 110 can be the front wall of the motor vehicle. Preferably, the line portion 2 is made of plastic and preferably injection-molded into the insulating structure 3. The insulating structure 3 can be a sound-insulating and/or thermally-insulating structure.

As is evident from FIG. 1, the drainage device 1 comprises a connecting part 4, by means of which the line portion 2 is fluidically connected to the water box 100. The connecting part 4 preferably consists of plastic and has a connecting piece portion 9, which is insertable into the line portion 2. Furthermore, the connecting part 4 has a collar 10, which on an end region of the connecting piece portion 9 projects to the outside.

The drainage device 1 is connectable to the water box 100 for example as described in the following. On a wall 130, in particular in its bottom, the water box 100 comprises a through-opening 120, on which the line portion 2 is oriented, so that via the through-opening 120 a flow connection between the water box 100 and the line portion 2 is established. The connecting part 4 with its connecting piece portion 9 at the front is now introduced into the through-opening 120 and in the process inserted into an end of the line portion 2. The connecting part 4 is inserted or pushed through the through-opening 120 and into the line portion 2 so far until the collar 10 comes to lie against the rimming of the through-opening 120.

In order to achieve a permanently fixed connection between the connecting piece portion 9 and the line portion 2, clip and/or engagement can be provided on the outer circumference of the connecting piece portion 9, in particular molded thereon, which on introducing into the line portion 2 enter into an operational position against associated counterpart of the line portion 2 and because of this establish a clip connection and/or engagement connection between the connecting part 4 and the line portion 2. A releasable fastening of the connecting piece portion 9 against the line portion 2 can also be provided through establishing a press connection or other clamping connection or a positively joined connection, such as for example a screw connection or bayonet connection.

Figure 2:
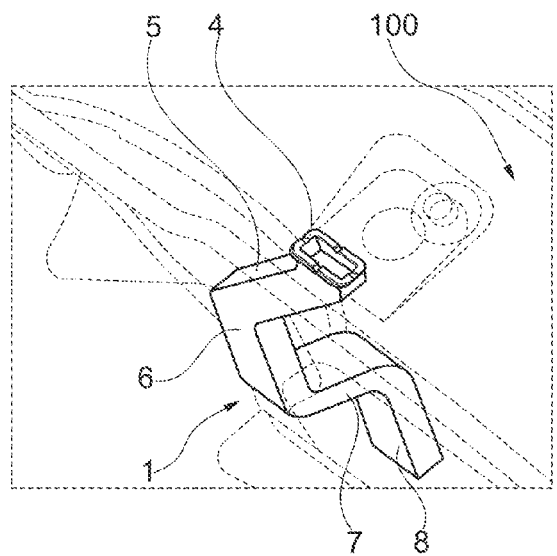
FIG. 2 is the drainage device according to FIG. 1 in the installed state in a perspective representation.

FIG. 2 shows the drainage device 1, installed in the water box 100 in a perspective representation from the top. The bottom of the water box 100 is substantially shown transparent, so that the parts located below the bottom of the water box 100 are visible. As is evident from FIG. 2, the line portion 2 comprises a plurality of portions 5, 6, 7 and 8, in particular length portions, which, seen in longitudinal direction of the line portion 2, are arranged located one behind the other. In the installed state of the drainage device 1, the portion 5 faces the connecting part 4. The portion 5 is followed by the portion 6, which in turn is followed by the portion 7 and the portion 8 thereon.

As is evident from FIG. 2, the portions 5 and 6 are arranged angularly to one another. The portions 6 and 7 are likewise arranged angularly to one another. The portions 7 and 8 are also arranged angularly to one another. The portions 5 and 6 can span a common plane. The portion 7 projects out of the common plane. The portion 8 can be arranged substantially running parallel to the plane. Through the arrangement of the portions 5, 6, 7 and 8 to one another, the course of the line portion 2 can be specifically adapted to the course of the wall 110, against which the insulating structure 3 connected to the line portion 2 can be laid.

Figure 3:
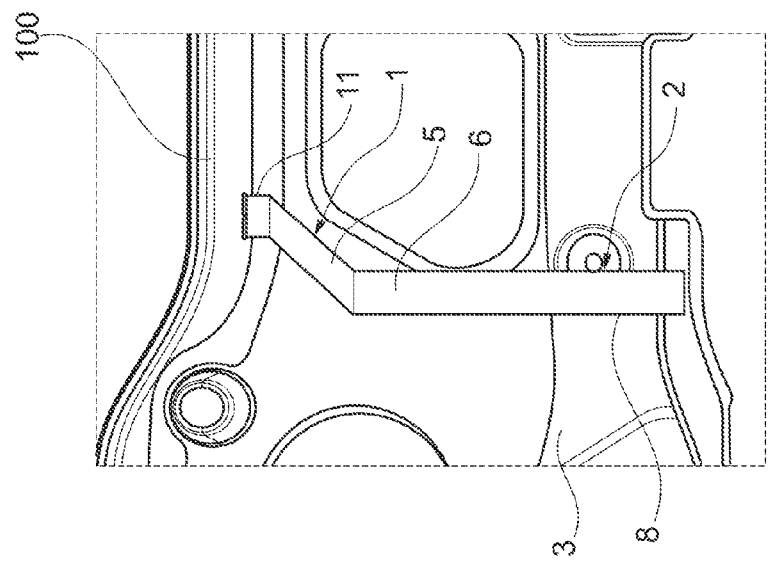
FIG. 3 is the drainage device according to FIG. 1 in the installed state in a front view.
Figure 4:
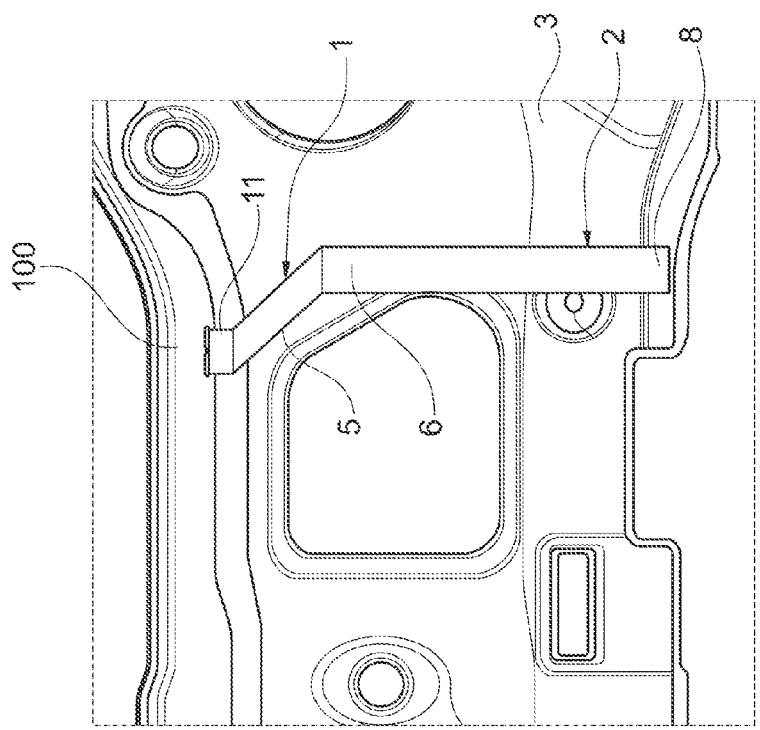
FIG. 4 is the drainage device according to FIG. 1 in the installed state in a rear view.

FIG. 3 and FIG. 4 show the drainage device 1 in the installed state on the water box 100 in a front view (FIG. 3) and in a rear view (FIG. 4). These show among other things the course of the line portion 2. The portions 6, 7 and 8 are arranged running in a common plane therein. The portion 5 is arranged angularly to the portion 6 and projects out of the common plane. The portion 5 is followed by a flange portion 11 on the end side, which preferentially is arranged angularly with respect to the portion 5 and into the open end of which the connecting piece portion 9 of the connecting part 4 is introduced.

Figures 5, 6:
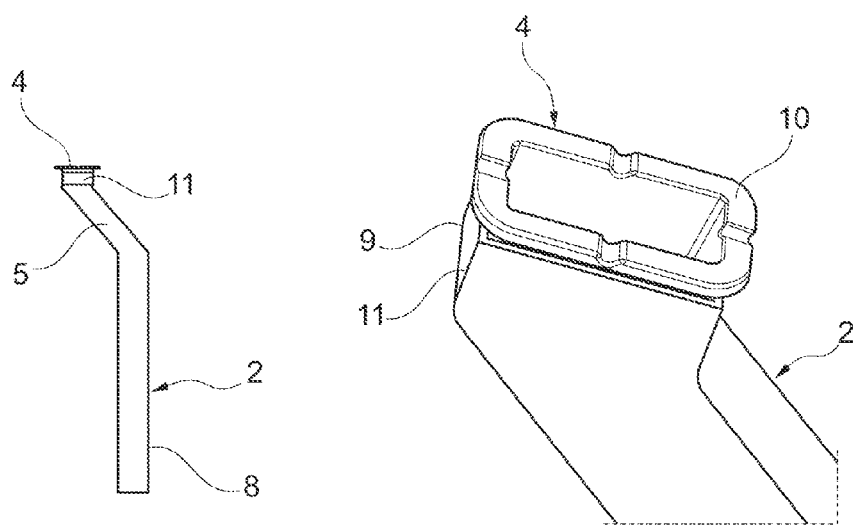
FIG. 5 is a line portion with a connection part of the drainage device according to FIG. 1 attached thereto in lateral view.
FIG. 6 is the connecting part and the line portion according to FIG. 5 in a detail as perspective representation from the top onto the connecting part.

FIG. 5 shows the course of the line portion 2 and the connecting part 4 mounted to the flange portion 11 without the insulating structure and without the water box. FIG. 6 shows the end region of the line portion 2 according to FIG. 5, on which the connecting part 4 is mounted. As is evident from this, the connecting piece portion 9 has a substantially rectangular cross section. The collar 10 surrounding the connecting piece portion 9 is correspondingly formed substantially in the manner of a frame of rectangular extension.

FIG. 6 furthermore shows that the flange portion 11 of the line portion 2 has a cross section corresponding to the connecting piece portion 9, which preferentially is likewise substantially rectangular. This is followed by portion 2. Preferably, all length portions of the line portion 2, at least the portions 5, 6, 7, 8 and 11 are formed with substantially identical cross section, in particular same cross-sectional dimension.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A drainage device for a motor vehicle that is configured for discharging liquid out of a water box of the motor vehicle, comprising:
    an insulating structure for a wall of the motor vehicle, the insulating structure coupled to the wall of the motor vehicle and the wall of the motor vehicle defines an opening;
    a line portion that is at least partially incorporated in the insulating structure for the wall, the line portion having a first end spaced apart from the opening and fluidly connected to the opening via a connecting part, the first end of the line portion surrounded by the insulating structure; and
    the connecting part including a collar that engages a circumference of the opening and a connection portion that extends from the collar and is insertable into the first end of the line portion such that a connection between the first end of the line portion and the connection portion is surrounded by the insulating structure,
    wherein the insulating structure is disposed between the wall and the line portion.

2. The drainage device according to claim 1, wherein the line portion is surrounded by the insulating structure.

3. The drainage device according to claim 1, wherein the line portion is arranged in a depression of the insulating structure.

4. The drainage device according to claim 1, wherein the line portion runs along a face side on the insulating structure facing the wall.

5. The drainage device according to claim 1, wherein the course of the line portion substantially corresponds to the course of the wall in an installation region of the drainage device.

6. The drainage device according to claim 1,
    wherein the line portion comprises a plurality of length portions, wherein adjacent length portions are arranged angularly to one another and at least two of the length portions form a plane, and
    wherein at least one the length portions projects out of the plane.

7. The drainage device according to claim 1, wherein the line portion is injection-molded into the insulating structure.

8. The drainage device according to claim 1, wherein the line portion is at least partially formed of plastic.

9. The drainage device according to claim 1, wherein the connecting piece portion comprises at least one engagement that on inserting the connecting piece portion into the line portion enters into an operational position against a counterpart means of the line portion in a positively joined manner.

10. A drainage device for a motor vehicle that is configured for discharging liquid out of a water box of the motor vehicle, comprising:
    an insulating structure for a front wall of the motor vehicle, the front wall of the motor vehicle defining an opening;
    a line portion that is at least partially incorporated in the insulating structure for the front wall, the line portion having a first end spaced apart from the opening and fluidly connected to the opening via a connecting part, at least the first end of the line portion surrounded by the insulating structure; and
    the connecting part including a collar that engages a circumference of the opening and a connection portion that extends from the collar and is insertable into the first end of the line portion such that a connection between the first end of the line portion and the connection portion is surrounded by the insulating structure.

* * * * *